United States Patent
Balthes et al.

(10) Patent No.: US 11,015,504 B2
(45) Date of Patent: May 25, 2021

(54) METHOD FOR OPERATING AN INTERNAL COMBUSTION ENGINE OF A MOTOR VEHICLE, IN PARTICULAR A MOTOR CAR

(71) Applicant: Daimler AG, Stuttgart (DE)

(72) Inventors: Ortwin Balthes, Sachsenheim (DE); Berthold Keppeler, Owen (DE); Juergen Kuckelsberg, Esslingen am Neckar (DE); Siegfried Mueller, Ingersheim (DE); Thorsten Woog, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/756,606

(22) PCT Filed: Oct. 15, 2018

(86) PCT No.: PCT/EP2018/078067
§ 371 (c)(1),
(2) Date: Apr. 16, 2020

(87) PCT Pub. No.: WO2019/076807
PCT Pub. Date: Apr. 25, 2019

(65) Prior Publication Data
US 2020/0263583 A1 Aug. 20, 2020

(30) Foreign Application Priority Data
Oct. 17, 2017 (DE) ..................... 10 2017 009 612.0

(51) Int. Cl.
*F01N 3/20* (2006.01)
*F01N 3/023* (2006.01)
(Continued)

(52) U.S. Cl.
CPC ......... *F01N 3/208* (2013.01); *B60W 50/0097* (2013.01); *F01N 3/023* (2013.01);
(Continued)

(58) Field of Classification Search
CPC .. B60W 50/0097; F01N 13/009; F01N 3/023; F01N 3/035; F01N 3/0814; F01N 3/0842;
(Continued)

(56) References Cited

U.S. PATENT DOCUMENTS

2010/0043404 A1* 2/2010 Hebbale .................... F01N 9/00
60/286

FOREIGN PATENT DOCUMENTS

| DE | 10 2010 025 791 A1 | 1/2012 |
| DE | 10 2015 014 150 A1 | 11/2016 |
| DE | 10 2016 014 854 A1 | 7/2017 |

OTHER PUBLICATIONS

PCT/EP2018/078067, International Search Report dated Nov. 28, 2018 (Two (2) pages).
(Continued)

*Primary Examiner* — Brandon D Lee
(74) *Attorney, Agent, or Firm* — Crowell & Moring LLP (57) ABSTRACT

A method for operating an internal combustion engine of a motor vehicle, which has an exhaust gas system that exhaust gas from at least one combustion chamber of the internal combustion chamber can flow through and includes at least one nitrogen oxide storage catalyst, at least one particulate filter, and at least one selective catalytic reduction (SCR) catalyst.

8 Claims, 3 Drawing Sheets

(51) Int. Cl.
  *F01N 3/08* (2006.01)
  *B60W 50/00* (2006.01)
  *F02D 41/02* (2006.01)
  *F02D 41/14* (2006.01)

(52) U.S. Cl.
  CPC .... *F01N 3/0814* (2013.01); *F01N 2900/0601* (2013.01); *F01N 2900/08* (2013.01); *F01N 2900/10* (2013.01); *F01N 2900/1402* (2013.01); *F01N 2900/1622* (2013.01); *F01N 2900/1806* (2013.01); *F02D 41/029* (2013.01); *F02D 41/0275* (2013.01); *F02D 2041/1412* (2013.01)

(58) Field of Classification Search
  CPC ........ F01N 3/0871; F01N 3/106; F01N 3/208; F01N 9/00; F01N 9/002; F01N 2560/026; F01N 2610/02; F01N 2900/0416; F01N 2900/0601; F01N 2900/08; F01N 2900/10; F01N 2900/12; F01N 2900/1402; F01N 2900/1606; F01N 2900/1614; F01N 2900/1622; F01N 2900/1806; F02D 41/1461; F02D 41/1466; F02D 2041/1412; F02D 2200/0625; F02D 2200/70; F02D 2200/701; F02D 41/0275; F02D 41/029; F02D 41/14; Y02A 50/20; Y02T 10/12; Y02T 10/40
  See application file for complete search history.

(56) References Cited

OTHER PUBLICATIONS

German Search Report issued in German application No. 10 2017 009 612.0 dated Jun. 28, 2018, with Statement of Relevancy (Ten (10) pages).

* cited by examiner

METHOD FOR OPERATING AN INTERNAL COMBUSTION ENGINE OF A MOTOR VEHICLE, IN PARTICULAR A MOTOR CAR

BACKGROUND AND SUMMARY OF THE INVENTION

The invention relates to a method for operating an internal combustion engine of a motor vehicle, in particular a motor car.

DE 10 2010 025 791 A1 discloses a method for pollutant reduction by determining a route from a starting point to a target point in a navigation system for a motor vehicle, wherein, when determining the routes, the pollutant emission is considered for travelling the route. Here, it is provided that the reverse flows of fuel consumption and $NO_x$—untreated emissions are taken into consideration.

The object of the present invention is to create a method by means of which a particularly low-emission operation of the internal combustion engine of a motor vehicle can be achieved.

With the method according to the invention for operating an internal combustion engine formed, in particular as a reciprocating piston engine, of a motor vehicle, in particular a motor car, such as a passenger motor vehicle, the internal combustion engine has an exhaust gas system that exhaust gas can flow through from at least one combustion chamber, formed, for example, as a cylinder, of the internal combustion engine. The exhaust gas system comprises at least one nitrogen oxide storage catalyst, which is also referred to as an NSK or storage catalyst or storage cat. Moreover, the exhaust gas system comprises at least one particulate filter formed, for example, as a diesel particulate filter, which is preferably arranged downstream of the storage catalyst. Moreover, the exhaust gas system comprises at least one SCR catalyst, by means of which the exhaust gas can be denitrified. Denitrifying the exhaust gas is to be understood to mean that any nitrogen oxide ($NO_x$) contained in the exhaust gas can be removed at least partially from the exhaust gas by the selective catalytic reduction (SCR). Here, the SCR catalyst is formed to cause or support the SCR, wherein, as part of the SCR, nitrogen oxides potentially contained in the exhaust gas react to form nitrogen and water.

The SCR catalyst comprises, for example, a first catalyst element that is catalytically effective in terms of the SCR or for the SCR the catalytic element being formed, for example, by at least one first catalyst layer. The first catalyst element or the first catalyst layer is integrated, for example, into the particulate filter, such that the particulate filter has, for example, the first layer that is catalytically effective for the SCR. Thus, the particulate filter is formed, for example, as an SDPF.

Alternatively or additionally, the SCR catalyst comprises, for example, at least one second catalyst element, which is catalytically effective, for example, in terms of or for the selective catalytic reduction. For example, the second catalytic element is formed by a second catalyst layer, which is catalytically effective for the SCR. Here, the second catalyst element, for example, is arranged downstream of the particulate filter in the flow direction of the exhaust gas flowing through the exhaust gas system. Alternatively or additionally, it is conceivable that the SCR catalyst has a third catalyst element that is catalytically effective for the SCR or in terms of the SCR and can be formed, for example, by a third catalyst layer. Here, the third catalyst layer is catalytically effective for the SCR. Here, it is conceivable that the third catalyst element or the third catalyst layer is arranged upstream of the particulate filter and/or upstream of the second catalyst element. The respective layer is formed, for example, by a corresponding coating, which is applied, for example, to a carrier.

Furthermore, it is conceivable that the SCR catalyst is arranged downstream of the particulate filter and thus is formed as a component arranged downstream of the particulate filter. Here, it is possible, in particular, that the particulate filter has at least one layer or coating that is catalytically effective for or in terms of the SCR, such that the particulate filter, for example, is formed as a particulate filter having an SCR coating, in particular as an SDPF. The particulate filter formed, in particular, as an SDPF and the SCR catalyst arranged downstream of the particulate filter are arranged, for example, in a common housing and/or form an exhaust gas after-treatment unit, which is also referred to as a sleeve or combi-sleeve.

The method according to the invention comprises a first step, in which projection data, which characterizes at least one expected future operating state of the internal combustion engine, is predictively determined by means of an electronic computing device, in particular of the internal combustion engine. The predictive determination is also referred to as projecting determination, since the internal combustion engine does not currently have the predictively determined operating state but will probably have it in the very near future. In other words, the operating state at a first point in time, for example, is determined, wherein, however, the internal combustion engine does not have the operating state at the first point in time, but will probably have it at a second point in time in the future following the first point in time.

In a second step of the method according to the invention, at least one current nitrogen oxide emission of the internal combustion engine is determined, in particular recorded, by means of at least one nitrogen oxide sensor device. Furthermore, at least one current reductant emission of the internal combustion engine is determined, in particular recorded, by means of the nitrogen oxide sensor device. The nitrogen oxide and/or reductant emission is determined or recorded, for example, at a respective recording point, wherein the recording point is arranged downstream of the storage catalyst, downstream of the particulate filter and downstream of the SCR catalyst or downstream of the second catalyst element.

The nitrogen oxide emission is to be understood, for example, as a quantity of nitrogen oxides ($NO_x$) contained in the exhaust gas, in particular at the recording point. The reductant emission is to be understood, for example, as an amount of reductant contained in the exhaust gas, in particular at the corresponding recording point, wherein the reductant is used, for example, for denitrifying the exhaust gas. As part of the SCR, the reductant reacts with nitrogen oxides contained in the exhaust gas, for example, to form water and nitrogen. The reductant is preferably ammonia ($NH_3$) or the reductant comprises at least ammonia or releases ammonia, in particular when the reductant is introduced, in particular dosed, into the exhaust gas that is, in particular, hotter in comparison to the reductant. In particular, it is conceivable that an aqueous urea solution (HWL) is used as the reductant, which is introduced into the exhaust gas and thus provides ammonia for the SCR. Here, in particular, the reductant emission is to be understood as an amount of ammonia contained in the exhaust gas, in particular at the corresponding recording point, which is, for example, the reductant or is provided by this.

In a third step of the method according to the invention, a current fuel consumption of the internal combustion engine is determined. The internal combustion engine is operated, for example, in a fired operation during the method. During the fired operation, at least air and fuel are introduced into the combustion chamber, formed, in particular, as a cylinder, for operating the internal combustion engine in the fired operation. The fuel is, for example, a liquid fuel, in particular a diesel fuel or a petroleum fuel. The air introduced into the combustion chamber and the, in particular liquid, fuel introduced into the combustion chamber, form a fuel-air mixture, which is combusted. The exhaust gas is the result of this. In particular, during the fired operation, mixtures are formed and combusted in the described manner one after the other, whereby fuel is used up. The fuel consumption thus characterizes an amount of the fuel consumed by the internal combustion engine, in particular in relation to a time period that can be predetermined or a driving route of the motor vehicle that can be predetermined.

In a fourth step of the method, at least one current particulate emission of the internal combustion engine is determined. The particulate emission is determined, in particular, at or for a measuring point, in particular recorded. The particulate emission characterizes, for example, a number of particulates contained in the exhaust gas, in particular at the further recording point, in particular of carbon black particulates, wherein the further measuring point is arranged upstream or downstream of the particulate filter, for example.

In a fifth step of the method, a current reductant filling level of the SCR catalyst is determined. The reductant filling level is to be understood as an amount, contained in the SCR catalyst, of the reductant formed, in particular, as ammonia, such that the reductant filling level is to be understood as an amount of ammonia received in the SCR catalyst. Thus, the current reductant filling level characterizes an amount of reductant currently received in the SCR catalyst, in particular of ammonia ($NH_3$).

In a sixth step of the method, a current nitrogen oxide load of the nitrogen oxide storage catalyst is determined. The nitrogen oxide storage catalyst is used to collect or retain nitrogen oxides potentially contained in the exhaust gas. To do so, at least one part of the nitrogen oxides potentially contained in the exhaust gas is stored by means of or in the nitrogen oxide storage catalyst. With increasing operation duration, an amount of nitrogen oxide stored in the nitrogen oxide storage catalyst or of nitrogen oxides stored in the nitrogen oxide storage catalyst increases, wherein the quantity of nitrogen oxides stored in the nitrogen oxide storage catalyst is also referred to as the load of the nitrogen oxide storage catalyst. Thus, the current nitrogen oxide load of the nitrogen oxide storage catalyst characterizes a quantity of nitrogen oxides currently received or stored in the nitrogen oxide storage catalyst.

The method according to the invention further comprises a seventh step which is carried out depending on the first step, the second step, the third step, the fourth step, the fifth step and the sixth step. In the seventh step of the method, operating parameters are determined, in particular calculated, by means of the electronic computing device, on the basis of which the internal combustion engine, in particular in its fired operation, is operated, in particular regulated. Thus, the operating parameters are determined depending on the first step, the second step, the third step, the fourth step, the fifth step and the sixth step, in particular depending on their results or sample values. In other words, the first step, the second step, the third step, the fourth step, the fifth step and the sixth step are requests, as part of which the projection data, the current nitrogen oxide emission, the current reductant emission, the current fuel consumption, the current particulate emission, the current reductant filling level and the current nitrogen oxide load are sampled or determined. Thus, the predictively determined projection data, the determined current nitrogen oxide emission, the determined current reductant emission, the current fuel consumption, the determined current particulate emission, the determined current reductant filling level and the determined current nitrogen oxide load are sample values or sample results, on the basis of which the seventh step is carried out. Thus, the operating parameters are determined, in particular calculated, depending on the sample values, whereupon the internal combustion engine, for example, is operated, in particular regulated, based on the operating parameters.

Furthermore, in the seventh step of the method and thus depending on the sample values, at least one desired reductant filling level of the SCR catalyst is calculated. The determined current reductant filling level of the SCR catalyst is an actual reductant filling level or an actual value, wherein the target reductant filling level is a target value, which is particularly advantageous, for example, for operating the internal combustion engine, in particular in the future, in order to be able to achieve a particularly low-emission operation.

In particular, it is possible that the actual reductant filling level is compared to the target reductant filling level. If, for example, the actual reductant filling level deviates from the target reductant filling level or if, for example, a difference between the actual reductant filling level and the target reductant filling level exceeds a predeterminable limit, then at least one measure can be adopted or carried out, in particular by means of the electronic computing device, such that a potential difference between the actual reductant filling level and the target reductant filling level is at least reduced or even removed by means of the measure. This measure is, for example, an increase of the amount of reductant that is introduced into the exhaust gas. As a result, the actual reductant filling level, for example, can be increased and, in particular, brought into line with the target reductant filling level or at least brought closer to it.

Furthermore, it is provided in the seventh step that, in particular depending on the comparison of the actual reductant filling level and the target reductant filling level, a reductant dosing amount to be introduced into the exhaust gas is calculated. In other words, the reductant dosing amount is calculated depending on the sample values. The reductant dosing amount to be introduced into the exhaust gas characterizes an amount of reductant to be introduced into the exhaust gas. In particular, the reductant dosing amount to be introduced into the exhaust gas is such an amount of reductant, which is to be introduced into the exhaust gas, in order to at least reduce or even remove a potential difference between the actual reductant filling level and the target reductant filling level, in particular within a predeterminable or desired time.

Furthermore, it is provided in the seventh step of the method that a respective point in time of the next regeneration of the nitrogen oxide storage catalyst and the particulate filter is calculated. In other words, it is provided that the respective point in time of the next regeneration of the nitrogen oxide storage catalyst and the particulate filter is calculated by means of the electronic computing device depending on the sample values.

The regeneration of the nitrogen oxide storage catalyst is to be understood as a process in which or by which the nitrogen oxide load of the nitrogen oxide storage catalyst is at least reduced. In other words, for example in the regeneration of the storage catalyst, at least one part of the nitrogen oxides initially stored in the storage catalyst is read out of the storage catalyst, whereby the nitrogen oxide load of the storage catalyst is at least reduced.

During or as a result of the regeneration of the particulate filter, its particulate load is at least reduced. The particulate load of the particulate filter is also referred to as the carbon black load or carbon black particulate load and characterizes a number of particulates received or stored in or by the particulate filter. In other words, particulates potentially included in the exhaust gas, in particular carbon black particulates, are at least partially filtered out of the exhaust gas by means of the particulate filter. With increasing operation duration, the particulate filter is afflicted with an increasing number of particulates from the exhaust gas, such that the particulate load of the particulate filter successively increases. During or by means of the regeneration of the particulate filter, the particulate load of the particulate filter is at least reduced. This means that the number of particulates received in the particulate filter is at least reduced by means of or during the regeneration of the particulate filter. The respective regeneration is caused, for example, by a sufficiently high temperature of the exhaust gas or is carried out at a sufficiently high temperature of the exhaust gas, such that the respective regeneration, for example, is caused or started such that the temperature of the exhaust gas is, in particular, targetedly or actively increased. Measures for increasing the temperature of the exhaust gas are also referred to as temperature increase measures or EGTM.

Overall, it is conceivable that a projection operation, in particular a projection regulation, of the internal combustion engine taking pollutant emissions and fuel consumption and thus $CO_2$ emissions into consideration is possible by means of the method according to the invention, such that, on one hand, the pollutant emissions of the internal combustion engine and, on the other hand, simultaneously the fuel consumption can be kept particularly low. To do so, an optimum is calculated, for example, constantly or several times during the operation of the internal combustion engine, in particular during a journey, the optimum enabling a particularly advantageous compromise between the realization of low fuel consumption and the realization of low pollutant emissions. In other words, an operation, in particular a regulation, of the internal combustion engine comprises the at least one combustion chamber, and the exhaust gas system is carried out taking the projection data into consideration and, in particular, in relation to the realization of a low fuel consumption, on one hand, and the realization of low pollutant emissions on the other hand.

It has been shown to be particularly advantageous when the seventh step is carried out in such a way that at least one first stipulation is fulfilled. The first stipulation comprises the fact that, during the operation of the internal combustion engine, at least its nitrogen oxide, hydrocarbon and particulate emissions are below respective threshold values stored in a storage device of the electronic computing device. The hydrocarbon emissions refer to emissions of unburned hydrocarbon (HC), wherein the seventh step is carried out and thus the operating parameters are determined and, consequently, the internal combustion engine is operated on the basis of the determined operating parameters in such a way that the nitrogen oxide, hydrocarbon and particulate emissions lie below the threshold values, in particular in all circumstances, It has further been shown to be particularly advantageous that the seventh step is carried out by maintaining the first stipulations in such a way that at least one second stipulation is fulfilled, which comprises the fact that the fuel consumption is minimal. In other words, the seventh step is carried out in such a way that the first stipulation can be fulfilled or become fulfilled under all circumstances. Yet the first stipulation has a higher priority than the second stipulation, such that the second stipulation does not necessarily have to be fulfilled, yet can advantageously be fulfilled and, in particular, is fulfilled when such an operation of the internal combustion engine based on the operating parameters is possible that both the first stipulation and the second stipulation are fulfilled. The minimum fuel consumption is to be understood to mean that the operating parameters are determined in such a way and thus the internal combustion engine is operated in such a way that, under all circumstances, the first stipulation is fulfilled, and the fuel consumption and thus the $CO_2$ emissions here are as low as possible.

In a particularly advantageous embodiment of the invention, pollutant emissions of the internal combustion engine are further optimized, i.e., reduced, in the seventh step by maintaining the first stipulation and the second stipulation. In other words, it is provided that the operating parameters are determined in such a way and, consequently, the internal combustion engine is operated in such a way that, in particular while the first stipulation and the second stipulation are fulfilled, the pollutant emissions are further reduced and thus clearly lie below the threshold value. The further optimisation of the pollutant emissions is, for example, a third priority, wherein the first stipulation and the second stipulation are each prioritized more highly than the further optimisation of the pollutant emissions. In other words, it is possible, for example, to fulfil both the first stipulation and the second stipulation, and it is moreover possible to further optimize the pollutant emissions, i.e., to further reduce them, thus this is carried out, yet only when and, in particular, as long as the first stipulation and the second stipulation are fulfilled and remain fulfilled.

Here, the pollutant emissions are further optimized by maintaining the first stipulation and the second stipulation, in particular, in such a way that the regeneration of the nitrogen oxide storage catalyst is planned in an anticipatory manner. To do so, it is provided, for example, that the regeneration of the nitrogen oxide storage catalyst is carried out when, for example, the internal combustion engine provides such a high load in any case when driving a route or stretch that it results in such high temperatures of the exhaust gas, which cause the regeneration of the nitrogen oxide storage catalyst or are advantageous for the regeneration of the nitrogen oxide storage catalyst. In this way, it can be avoided that the nitrogen oxide storage catalyst is regenerated during a period of time, during which the internal combustion engine does not provide a high load for driving the motor vehicle, and thus temperatures that are actually too low for the regeneration of the storage catalyst prevail. As a result, an extra temperature increase of the exhaust gas carried out for the regeneration of the storage catalyst can be avoided, since the storage catalyst is regenerated during such a period of time during which high temperatures of the exhaust gas that are thus sufficient or advantageous for the regeneration of the storage catalyst prevail in any case, for example because of an incline, which the motor vehicle is driving up.

It has been shown to be further advantageous when the pollutant emissions are further optimized in such a way that the reductant filling level of the SCR catalyst is regulated in an anticipatory manner. In doing so, it can be ensured that the SCR catalyst has a sufficiently high reductant filling level exactly at such a period in time at which such a high reductant filling level is required or advantageous in order to sufficiently denitrify the exhaust gas.

A further embodiment is characterised in that the first stipulation also comprises the fact that nitrous oxide ($N_2O$) and reductant emissions of the internal combustion engine also lie below respective threshold values stored in the storage device of the electronic computing device.

In a particularly advantageous embodiment of the invention, the projection data comprises expected future speeds of the motor vehicle and/or a route profile lying ahead and thus, for example, at least one slope and/or at least one incline and/or a remaining distance to a destination. The route profile lying ahead is to be understood as a route, in particular its topography, wherein the motor vehicle is driven along the route in the near future. The remaining distance to the destination can be determined, for example, by means of a route planned by means of a navigation system of the motor vehicle. The route runs, for example, from a starting location to the destination, such that the motor vehicle arrives at the destination when it is driven along the route. At least one current position, for example, of the motor vehicle on the earth is determined by means of the navigation system. By determining the current position of the motor vehicle and by determining or recognizing the destination, a spacing between the current position and the destination can be determined, wherein this spacing corresponds to the remaining distance.

Finally, it has been shown to be particularly advantageous when the method is carried out during a journey of the motor vehicle several times one after the other. This means that it is not the case, for example, that one one-time request value is provided before the start of a journey and/or when planning or optimizing a route, but rather the request values are constantly determined and the operating parameters are constantly determined and updated, such that both the emissions and the fuel consumption can be kept particularly low during the journey.

Further advantages, features and details of the invention arise from the description of a preferred exemplary embodiment below, as well as with the aid of the drawing. The features and combinations of features specified in the description above and the features and combinations of features specified in the description of the Figures and/or in the Figures only below can be used not only in the combination specified in each case, but also in other combinations or on their own without exceeding the scope of the invention.

DETAILED DESCRIPTION OF THE DRAWINGS

In the Figures, the same or functionally identical elements are provided with the same reference numerals.

Figure 1:
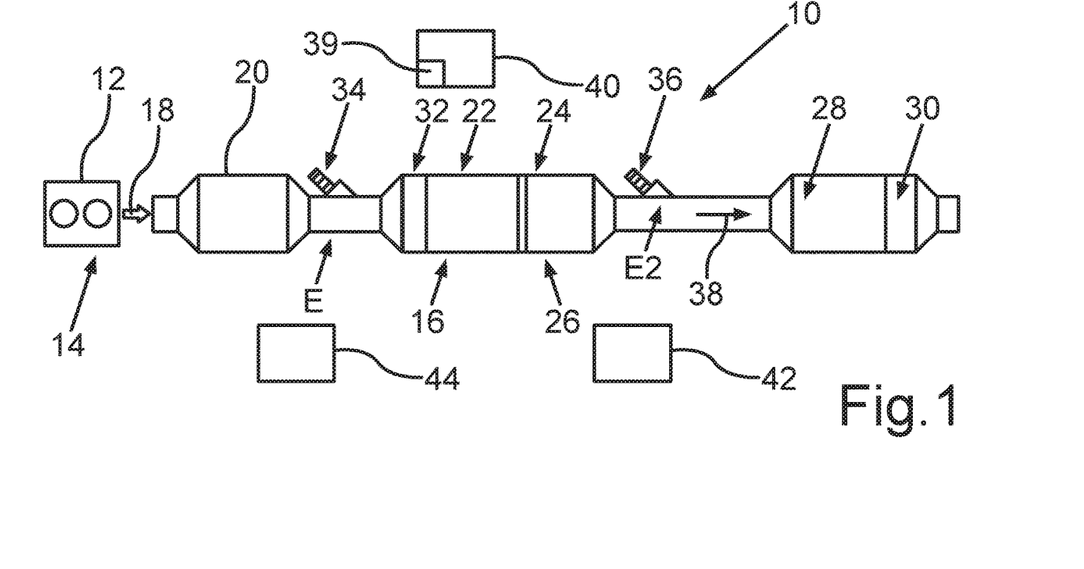
FIG. 1 is a schematic depiction of an internal combustion engine of a motor vehicle, which is operated by means of a method according to the invention.

In a schematic depiction, FIG. 1 shows an internal combustion engine, labelled as a whole by 10, of a motor vehicle, in particular a motor car and, preferably, a passenger motor vehicle. The internal combustion engine 10 is formed, for example, as a diesel engine, yet can alternatively be formed as a petrol engine. Below, a method for operating the internal combustion engine 10, in particular during a journey of the motor vehicle, is described. In other words, the method is carried out while the motor vehicle is driven by means of the internal combustion engine 10 or while the internal combustion engine 10 is in a fired operation.

The internal combustion engine 10 formed as a reciprocating piston engine has at least one engine housing 12, by means of which at least one or more combustion chambers 14 of the internal combustion engine 10 is formed. The respective combustion chamber 14 is formed, for example, as a cylinder. During the fired operation, the respective combustion chamber 14 is provided at least with air and a fuel for operating the internal combustion engine 10. The fuel is preferably a liquid fuel, which is used in order to achieve the fired operation of the internal combustion engine 10. The fuel and the air form a mixture in the respective combustion chamber 14, which is combusted. Exhaust gas is the result of this, which flows out of the combustion chamber 14, for example, and flows into an exhaust gas system 16 of the internal combustion engine 10 and flows through the exhaust gas system 16. This is illustrated in FIG. 1 by an arrow 18. For example, the arrow 18 illustrates a current direction of the exhaust gas flowing through the exhaust gas system 16.

The exhaust gas system 16 comprises a nitrogen oxide storage catalyst 20, which is also simply referred to as NSK or storage catalyst. Furthermore, the exhaust gas system 16 comprises at least one particulate filter 22, which is formed as a diesel particulate filter (DPF), for example when the internal combustion engine 10 is formed as a diesel engine. Moreover, the exhaust gas system 16 comprises at least one SCR catalyst 24, which is catalytically effective in terms of or for the selectively catalytic reduction (SCR). This means that the SCR catalyst 24, for example, causes or supports the SCR. To do so, the SCR catalyst 24 has, for example, at least one catalyst element, which is formed by at least one layer or coating catalytically effective for the SCR or comprises such a layer or coating.

It can be seen in FIG. 1 that, in the exemplary embodiment illustrated in FIG. 1, the SCR catalyst 24 is a component that is external in relation to the particulate filter 22, is additionally provided and, in particular, arranged downstream of the particulate filter 22, in particular in the current direction of the exhaust gas flowing through the exhaust gas system 16.

In the exemplary embodiment illustrated in FIG. 1, it is provided that the particulate filter 22, for example, is also formed as an SCR catalyst or functions as such an SCR catalyst and is thus catalytically effective for the SCR. To do so, the particulate filter 22, for example, has a layer or coating that is catalytically effective for the SCR which is also referred to as an SCR layer or SCR coating. In particular, the particulate filter 22 is thus formed, for example, as an SDPF.

The particulate filter 22 and the SCR catalyst 24 can be arranged in a common housing, for example. Alternatively or additionally, the particulate filter 22 and the SCR catalyst 24 form an exhaust gas after-treatment unit 26, which is also referred to as a sleeve or combi-sleeve. The motor housing 12 and thus the respective combustion chamber 14 are received, for example, in an engine bay of the motor vehicle. Here, the particulate filter 22 and the SCR catalyst 24 and thus the exhaust gas after-treatment unit 26 are formed as components next to the engine, which are also arranged in the engine bay.

The exhaust gas system 16 optionally comprises further exhaust gas after-treatment components in the form of a second SCR catalyst 28, an ammonia slip catalyst 30 and a third SCR catalyst 32. The further exhaust gas after-treatment components can be used all together and thus in the combination shown in FIG. 1 or in any other combination and, in particularly, individually. However, it is explicitly mentioned that the further exhaust gas after-treatment components are optionally provided and do not necessarily have to be provided, but rather can also be dispensed with.

The second SCR catalyst 28 is catalytically effective for the SCR and here is arranged downstream of the particulate filter 22 and downstream of the first SCR catalyst 24. The ammonia slip catalyst 30 is arranged downstream of the second SCR catalyst 24 and, here, downstream of the particulate filter 22 and downstream of the SCR catalyst 24. The third SCR catalyst 32 is catalytically effective for the SCR and, here, arranged upstream of the particulate filter 22 and upstream of the SCR catalyst 24 and downstream of the nitrogen oxide storage catalyst 20. In particular, it is possible that the SCR catalyst 32 is received in the housing mentioned above and/or is a component of the exhaust gas after-treatment unit 26. Thus, the third SCR catalyst 32 is, for example, a component next to the engine, which is also arranged in the engine bay. In contrast to this, the second SCR catalyst 24 and the ammonia slip catalyst 30 are undercarriage components, which are arranged outside the engine bay in the region of or below the undercarriage of the motor vehicle. The undercarriage is formed, for example, by a structure of the motor vehicle, wherein the structure can be formed, in particular, as a self-supporting body.

For example, the second SCR catalyst 28 and the ammonia slip catalyst 30 form a further exhaust gas after-treatment unit, which is also referred to as an after-treatment system. The after-treatment system is, for example, formed as a UB-SCR system in such a way that the second SCR catalyst 28 and the ammonia slip catalyst 30 are arranged below the undercarriage. Here, the undercarriage is also labelled with UB. The UB-SCR system is used optionally and, in particular, for a high load operation of the internal combustion engine 10. The exhaust gas system 16 further comprises a dosing device 43, by means of which an in particular liquid reductant can be introduced, in particular injected, into the exhaust gas flowing through the exhaust gas system 16 at an introduction point. In other words, it is provided as part of the method, for example, that the reductant is introduced, in particular injected, into the exhaust gas at the introduction point E by means of the dosing device 34.

The respective SCR catalyst 24, 28 or 32 and thus the particulate filter 22 or its layer that is catalytically effective for the SCR are used to denitrify the exhaust gas. Denitrifying the exhaust gas is to be understood to mean that nitrogen oxides ($NO_x$) potentially contained in the exhaust gas are at least partially removed from the exhaust gas. Here, as part of the SCR, the nitrogen oxides contained in the exhaust gas react with the reductant introduced into the exhaust gas to form nitrogen and water. The reductant is, in particular, ammonia ($NH_3$), which emerges, for example from an aqueous urea solution, which is introduced into the exhaust gas at the introduction point E by means of the dosing device 34.

Optionally, a second dosing device 36 is provided, by means of which the reductant can be or is introduced into the exhaust gas at a second introduction point E. The first introduction point E is arranged downstream of the nitrogen oxide storage catalyst 20 and upstream of the particulate filter 22, in particular upstream of the third SCR catalyst 32. In contrast, the second introduction point E2 is arranged downstream of the SCR catalyst 24 and upstream of the second SCR catalyst 28.

In FIG. 1, an arrow 38 illustrates a potential ammonia slip. It results in such an ammonia slip, for example, when at least one part of the reductant introduced into the exhaust gas does not take part in the SCR and thus does not react to form water and nitrogen as part of the SCR but remains unburned in the exhaust gas. In other words, it results in an ammonia slip when at least one part of the reductant does not react in the SCR catalysts 24 and 32 or in the particulate filter 22 as part of the SCR with the nitrogen oxides to form nitrogen and water. The ammonia slip catalyst 30 is used here in order to collect and retain unburned ammonia potentially contained in the exhaust gas at least partially, preferably at least extensively or completely and to convert it into nitrogen and water, for example. As a result, excessive ammonia emissions can be avoided.

In a first step of the method, projection data is determined by means of an electronic computing device 40 depicted particularly schematically in FIG. 1, the data characterizing at least one expected future operating state or, preferably, several expected future operating states of the internal combustion engine 10. In a second step of the method, at least one current nitrogen oxide and reductant emission of the internal combustion engine 10 is determined by means of at least one nitrogen oxide sensor device 42 particularly schematically depicted in FIG. 1. In a third step of the method, a current fuel consumption of the internal combustion engine 10 is determined, for example, in particular by means of the computing device 40. In a fourth step of the method, at least one current particulate emission of the internal combustion engine 10 is determined, in particular by means of the electronic computing device 40 and/or by means of a sensor device 44. In a fifth step of the method, a current reductant filling level of the SCR catalyst 24 and/or the particulate filter 22 or the exhaust gas after-treatment unit 26 is determined in particular by means of the electronic computing device 40, wherein the reductant filling level is also referred to as the filling degree, reductant filling degree, ammonia filling degree or $NH_3$ filling degree. In a sixth step of the method, a current nitrogen oxide load of the nitrogen oxide storage catalyst 20 is determined in particular by means of the electronic computing device 40.

In a seventh step of method, operating parameters are determined by means of the electronic computing device 40 depending on the first step, the second step, the third step, the fourth step, the fifth step and the sixth step, on the basis of which parameters the internal combustion engine 10 is operated or regulated, in particular by means of the electronic computing device 40. Furthermore, in the seventh step, at least one target reductant filling level of the SCR catalyst 24 and/or the particulate filter 22 and thus, in particular, the exhaust gas after-treatment unit 26 is calculated, in particular by means of the electronic computing device 40. Moreover, in the seventh step of the method, a reductant dosing amount to be introduced into the exhaust gas is calculated by means of the computing device 40. Moreover, in the seventh step of the method, a respective point in time of the next regeneration of the nitrogen oxide storage catalyst 20 and the particulate filter 22 is calculated by means of the computing device 40.

Figure 2:
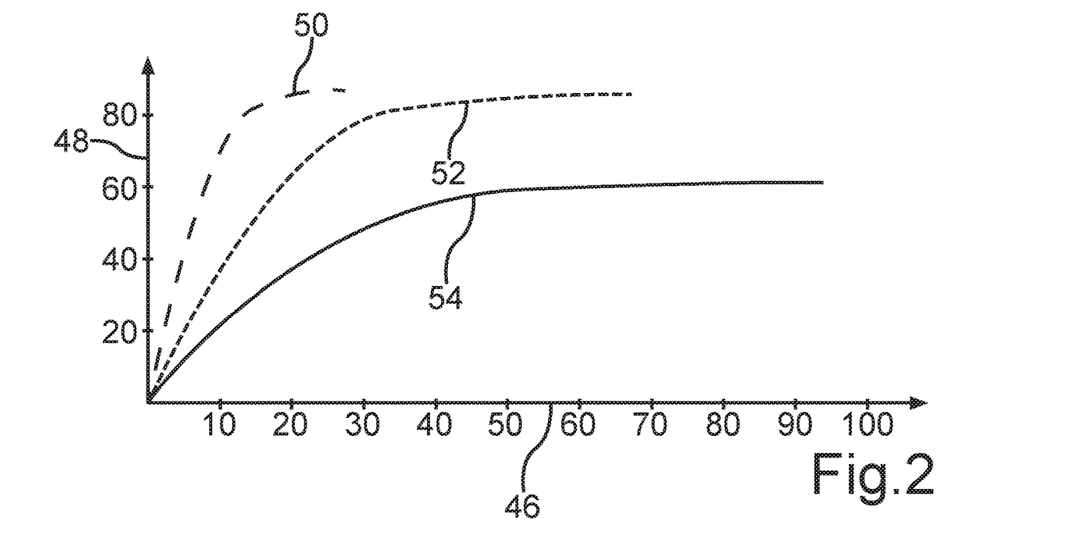
FIG. 2 is a diagram for illustrating the method.

FIG. 2 shows a diagram on whose abscissa 46 the $NH_3$ filling degree, also referred to as $NH_3$ filling level, is plotted, in particular in the unit of percentage. A so-called nitrogen oxide revenue is plotted on the y-axis 48, which is also referred to as $NO_x$ revenue. The nitrogen oxide revenue describes, for example, a ratio of the nitrogen oxides removed from the exhaust gas before the denitrification described above to nitrogen oxides contained overall in the exhaust gas. In other words, the nitrogen oxide revenue describes a ratio of a quantity of nitrogen oxides removed from the exhaust gas by the denitrification to a total quantity of nitrogen oxides contained in the exhaust gas. Thus, if the nitrogen oxide revenue is, for example, 100 percent, then all nitrogen oxides are removed from the exhaust gas by means of the exhaust gas system 16.

Courses 50, 52 and 54 illustrate the nitrogen oxide revenue via the $NH_3$ filling degree at a respective temperature of the exhaust gas. Here, the course 50 illustrates the nitrogen oxide revenue via the $NH_3$ filling level at a temperature of the exhaust gas of 300 degrees Celsius, while the course 52 illustrates the nitrogen oxide revenue at a temperature of 250 degrees Celsius and the course 54 the nitrogen oxide revenue at a temperature of 200 degrees Celsius.

Figure 3:
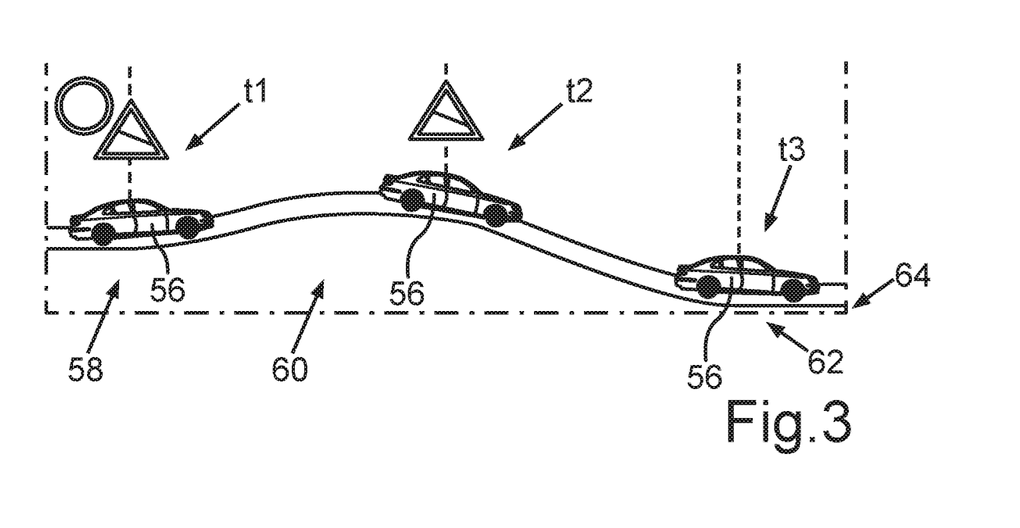
FIG. 3 is a further diagram for further illustrating the method.

FIG. 3 shows a diagram, by means of which the predictive or projected determination of the operating state or the operating states is illustrated. FIG. 3 shows the motor vehicle labelled in FIG. 3 with 56 at different points in time t1, t2 and t3, which follow on from one another, wherein the motor vehicle 56 at the point in time t1 drives a first stretch portion 58, at the point in time t2 a second stretch portion 60 following on from the stretch portion 58, and at a third point in time t3 a stretch portion 62, following on from the stretch portion 60, of a stretch 64. The stretch 64 is a stretch or a stretch profile, which is already known before the motor vehicle 56 drives or has driven along the stretch 64. In other words, the stretch 64 and thus the stretch portions 58, 60 and 62 are known at a point in time t0, at which the motor vehicle 56 has not yet driven along the stretch portions 58, 60 and 62 but is at a location or on a stretch portion, for example, which is before the stretch portions 58, 60 and 62 and thus before the stretch 64.

The stretch 64 is thus a stretch profile initially lying ahead of the motor vehicle 56, for example, along which the motor vehicle 56 will drive in the near future but is not yet currently driving. The stretch 64 lying ahead of the motor vehicle 56 is already known, for example, at the point in time t0 in that a route is or will be planned by means of a navigation system of the motor vehicle 56. Here, the route comprises, for example, the stretch 64 and thus the stretch portions 58, 60 and 62 and, for example, at least one further stretch portion not shown in FIG. 3. The route is planned, for example, at the point in time t0 or is already planned at the point in time t0. The route extends from a starting location to a destination at which the stretch 64 ends, for example. The starting location is, for example, a location that is known beforehand. By planning or defining the route, the stretch 64 lying ahead of the motor vehicle 56 is already known before the motor vehicle 56 has driven along the stretch 64. By means of the route and, in particular, by means of information about the route, information can be obtained, for example, which characterizes respective operating or load states which the internal combustion engine 10 will have when the motor vehicle 56 drives along the stretch 64.

In this way, when the motor vehicle is still at the starting location, it can be determined, for example, that the exhaust gas, for example, has a first temperature, while the motor vehicle 56 is driven along the stretch portion 58. Furthermore, it can be determined, for example, that the exhaust gas has a second temperature when the motor vehicle 56 is driven along the stretch portion 60, and the exhaust gas will have a third temperature when the motor vehicle 56 is driven along the stretch portion 62. Since, the stretch portion 58, for example, has a plane and an incline following on from this, the stretch portion 60 follows immediately on from the incline and has a slope and the stretch portion 62 follows immediately on from the slope, the second temperature, for example, is greater than the first temperature, and the third temperature is lower than the first temperature and lower than the second temperature.

In this way, it is possible, for example, to carry out the regeneration of the particulate filter 22 and/or the storage catalyst not, for example, on the stretch portion 58 or the stretch portion 62, but, for example, on the stretch portion 60, since there the exhaust gas has a temperature that is advantageous and sufficient for the respective regeneration in any case.

The predictively determined projection data is thus data, which is used, for example, for a predictive regeneration of the storage catalyst and/or the particulate filter 22 and for a filling, in particular pre-filling, of the exhaust gas aftertreatment unit 26 with reductant ($NH_3$). For example, as part of the projecting determination of the projection data, the following situations are taken into consideration:

temporal and/or spatial proximity to a parking location, wherein, depending on this, the storage catalyst is regenerated and the reductant filling level is raised. In doing so, advantageous nitrogen oxide conversion conditions for a restart, in particular of the internal combustion engine 10, can be achieved.

regions with tempo limit, in particular localities and specific traffic conditions such as traffic jams; depending on this, the storage catalyst can be regenerated and the reductant filling level raised, in order to create advantageous nitrogen oxide conditions, for example for low temperatures of the exhaust gas system 16.

temporal and/or spatial proximity to a longer slope stretch and, depending on this, regeneration of the storage catalyst and raising the reductant filling level. In doing so, advantageous nitrogen oxide conversion conditions can be achieved for low temperatures of the exhaust gas system 16.

negative trends of the temperature of the exhaust gas system 16 for a defined minimum time period and, depending on this, regeneration of the storage catalyst. In doing so, advantageous nitrogen oxide conversion conditions for low temperatures of the exhaust gas system 16 can be ensured.

In particular, predictive information is linked to trend-based prognoses, in particular in relation to sinking temperatures of the exhaust gas system 16. Exemplary situations of this are, for example, longer slope stretches and/or inclines, speed limits, longer parking phases, traffic delays or extreme acceleration.

The projection data is determined, for example, depending on chemical-physical data about the exhaust gas system 16 and/or temperature trends and/or nitrogen oxide untreated emission trends and/or trends in relation to the exhaust gas mass flows and/or in relation a capacity of the exhaust gas system 16 for receiving reductant. In particular, a simulative definition of an optimum operational strategy is carried out with the aid of the predictively determined projection data, in order to thus keep the fuel consumption, in particular, and the nitrogen oxide emissions particularly low, in particular to minimize them, to avoid ammonia slip and deposits of the reductant, and to ensure an optimum driving dynamic. Possible measures for this are, for example:

heating the exhaust gas and thus the exhaust gas system 16;
regenerating the storage catalyst;
adjusting the reductant filling level;
pre-filling the UB-SCR system;
reducing the nitrogen oxide untreated emissions; and
any combinations of these.

Figure 4:
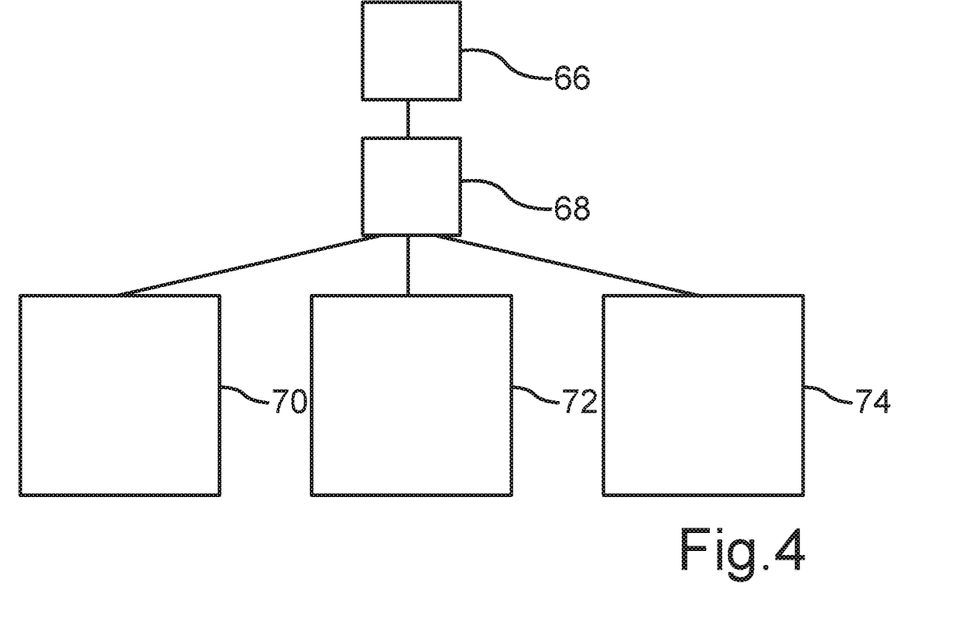
FIG. 4 is a flowchart for illustrating the method.

FIG. 4 shows a flowchart for further illustrating the method. Samples 68 are taken based on a normal operation 66. As part of the samples 68, an activity factor A, an incline stretch, a speed prognosis, a proximity to the destination and a negative temperature trend, for example, are sampled or determined. For example, the exhaust gas system 16 or during the method, for example, has a first temperature T5, in particular at a first point, and a second temperature T4, in particular at a second point different from the first point.

The activity factor is, for example, a factor which characterizes the activity of the exhaust gas system 16 in relation to the removal of carbon monoxide (CO) and unburned hydrocarbon (HC) from the exhaust gas. For example, if an activity model 70 reveals that the activity factor does not reach a predetermined limit of, for example, 0.2 and 0.4, then an activation is carried out, for example, in particular of the storage catalyst, in particular until the activity factor exceeds a predeterminable limit of 0.8, for example.

For example, if there is a negative temperature trend present, in particular in relation to T4 and/or T5, of longer than 10 minutes, in particular at T4<250 degrees Celsius, and if the nitrogen oxide load is more than 1 gram per liter of volume and if, for example, T5 is more than 200 degrees Celsius, then a denitrification, for example, takes place, in particular of the storage catalyst, in particular until the nitrogen oxide load is less than 1 gram per liter of volume. This is carried out, for example, with a block 72.

With a block 74, the proximity to the destination, the speed prognoses and the incline stretch, for example, are taken into consideration. If, for example, the local and/or temporal proximity to the destination is less than 5 kilometers or less than 5 minutes, if the nitrogen oxide load is more than 1 gram and if T5, for example, is more than 200 degrees Celsius, then the storage catalyst, for example, is denitrified, in particular until the nitrogen oxide is less than 1 gram per liter of volume.

If, for example, the speed prognoses reveal that a speed of the motor vehicle of less than 50 kilometers per hour is present for a time period of more than 10 minutes, and if the nitrogen oxide load is more than 1 gram per liter of volume, and if, for example, T5 is more than 200 degree Celsius, then the storage catalyst, for example, is denitrified, in particular until the nitrogen oxide load is less than 1 gram per liter of volume. If, for example, the incline stretch or an incline prognosis results in an incline which is more than 5 percent for more than 10 minutes, and if the nitrogen oxide load is more than 1 gram per liter of volume and if, for example, T5 is higher than 200 degree Celsius and/or T4 is lower than 250 degree Celsius, then the storage catalyst, in particular, is denitrified, in particular until the nitrogen oxide load is less than 1 gram per litre of volume. All this is carried out, for example, taking the age of the exhaust gas system 16 into consideration.

Thus, FIG. 4 describes trigger conditions for the regeneration of the storage catalyst. This means that the denitrification, mentioned above, of the storage catalyst is the regeneration of the storage catalyst.

Figure 5:
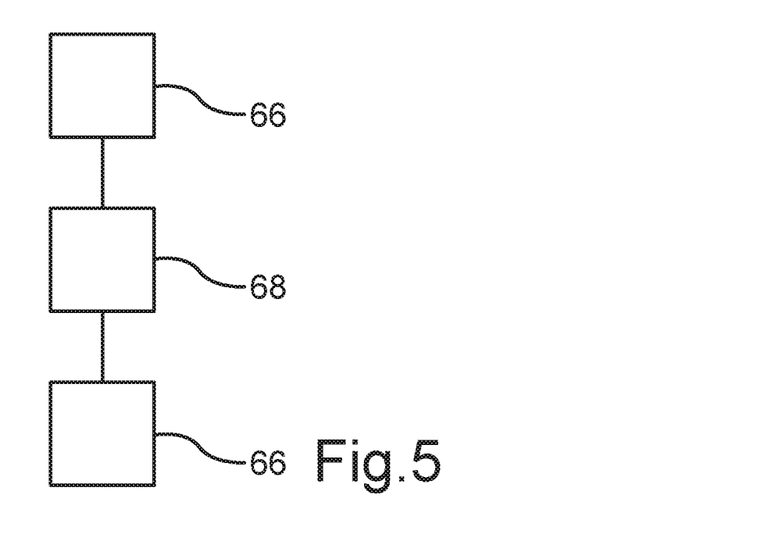
FIG. 5 is a further flowchart for further illustrating the method.

FIG. 5 shows a flowchart for further illustrating the method. In particular, FIG. 5 illustrates an optimized loading strategy as part of which the exhaust gas after-treatment unit 26 is loaded with reductant. Thus, as part of the loading strategy, the reductant filling level of the exhaust gas after-treatment unit 26 is set, for example, in particular raised. For example, samples 68 are taken based on the normal operation 66, in which an incline stretch, a speed, a proximity to the destination and a negative temperature trend, in particular in relation to the first temperature T5 of the exhaust gas system 16 or the exhaust gas, are sampled or determined.

If, for example, a negative trend of the first temperature T5 of the exhaust gas system 16 or the exhaust gas is determined for a period of time of more than 10 minutes, in particular at T5<300 degrees Celsius, then the reductant filling level, for example, is raised to a value which is 50 percent greater than a target value, in particular during the normal operation 66. If, for example, the proximity to the destination is less than 5 kilometers or less than 5 minutes and if the temperature T5 is less than 250 degrees Celsius, then the reductant filling level, for example, is set to a value, which is 50 percent greater than the target value, in particular during the normal operation 66. If, for example, the speed prognoses reveal that the speed of the motor vehicle will be less than 50 kilometers per hour for a time period of more than 10 minutes and if, here, T5 is less than 250 degrees Celsius, then the reductant filling level, for example, is set to a value that is 50 percent greater than the target value, in particular during the normal operation 66. If, thereupon, the temperature T5 is then more than 250 degrees Celsius, the normal operation 66 is then set again or carried out.

Figure 6:
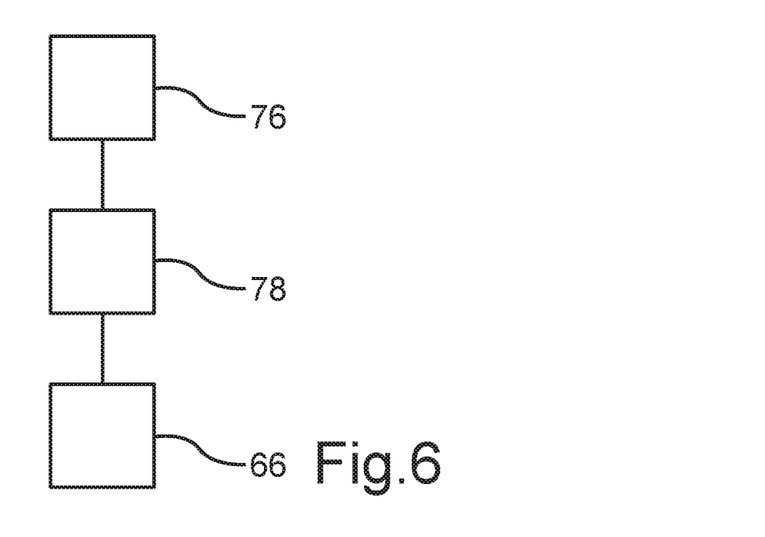
FIG. 6 is a further flowchart for further illustrating the method.

Finally, FIG. 6 shows a further flowchart for further illustrating the method. For example, samples 78 are taken based on an engine start 76 in which the internal combustion engine 10 is started. As part of the samples 78, for example, the current nitrogen oxide load of the storage catalyst and the current reductant filling level of the exhaust gas after-treatment unit 26 and the temperatures T4 and T5 are sampled or determined. In particular, FIG. 6 illustrates a functional structure for the cold-start or restart of the internal combustion engine 10. If, for example, the nitrogen oxide load is more than 1 gram per liter of volume, then the temperature of the exhaust gas is actively increased, in particular until the temperature T4 is greater than 220 degrees Celsius. Then, it is transferred into the normal operation 66, for example.

If, for example, the nitrogen oxide load of the storage catalyst is less than 1 gram per liter of volume and if the temperature T4 is more than 80 degrees Celsius, then it is transferred directly into the normal operation 66, for example, in particular without actively increasing the temperature of the exhaust gas. If, for example, the nitrogen oxide load of the storage catalyst is less than 1 gram per liter of volume and if, here, the temperature T4 is less than 80 degrees Celsius, then measures for increasing the temperature of the exhaust gas, for example, are carried out, such that the temperature of the exhaust gas is specifically increased. Thereupon, if, for example, the temperature T4 is more than 120 degrees Celsius, then it is transferred into the normal operation 66. If, for example, the temperature T5 is more than 200 degrees Celsius, then it is transferred directly into the normal operation 66. As already illustrated in relation to FIG. 4, the method illustrated in more detail by means of FIG. 5 and by means of FIG. 6 is carried out, for example, taking the age of the exhaust gas system 16 into consideration.

LIST OF REFERENCE CHARACTERS

10 Internal combustion engine
12 Engine housing
14 Combustion chamber
16 Exhaust gas system
18 Arrow
20 Nitrogen oxide storage catalyst
22 Particulate filter
24 SCR catalyst
26 Exhaust-gas after-treatment unit
28 SCR catalyst
30 Ammonia slip catalyst
32 SCR catalyst
34 Dosing device
36 Dosing device
38 Arrow
40 Electronic computing device
42 Nitrogen oxide sensor device
44 Sensor device
46 Abscissa
48 Y-axis
50 Course
52 Course
54 Course
56 Motor vehicle
58 Stretch portion
60 Stretch portion
62 Stretch portion
64 Stretch
66 Normal operation
68 Samples
70 Activity model
72 Block
74 Block
76 Engine start
78 Samples
E Injection point
E2 Injection point
t1 Time point
t2 Time point
t3 Time point

The invention claimed is:

1. A method for operating an internal combustion engine of a motor vehicle, which has an exhaust gas system through which an exhaust gas from a combustion chamber of the internal combustion engine is flowable and which has a nitrogen oxide storage catalyst, a particulate filter, and a selective catalytic reduction (SCR) catalyst, comprising the steps of:
   a) predictively determining projection data which characterizes an expected future operating state of the internal combustion engine by an electronic computing device;
   b) determining a current nitrogen oxide and reductant emission in the exhaust gas of the internal combustion engine by a nitrogen oxide sensor device;
   c) determining a current fuel consumption of the internal combustion engine;
   d) determining a current particulate emission of the internal combustion engine;
   e) determining a current reductant filling level of the SCR catalyst;
   f) determining a current nitrogen oxide load of the nitrogen oxide storage catalyst; and
   g) depending on steps a) to f) and performed by the electronic computing device:
      determining operating parameters on a basis of which the internal combustion engine is operated;
      calculating a target reductant filling level of the SCR catalyst;
      calculating a reductant dosing amount to be introduced into the exhaust gas; and
      calculating a respective point in time of a regeneration of the nitrogen oxide storage catalyst and of the particulate filter;
   wherein step g) is carried out such that a first stipulation is fulfilled which comprises a first fact that, during an operation of the internal combustion engine, nitrogen oxide, hydrocarbon, and particulate emissions of the internal combustion engine are below respective threshold values stored in a storage device of the electronic computing device.

2. The method according to claim 1, wherein step g) is performed by maintaining the first stipulation such that a second stipulation is fulfilled which comprises a fact that fuel consumption is minimal.

3. The method according to claim 2, wherein in step g), by maintaining the first stipulation and the second stipulation, pollutant emissions of the internal combustion engine are reduced.

4. The method according to claim 3, wherein the pollutant emissions are optimized by maintaining the first stipulation and the second stipulation such that the regeneration of the nitrogen oxide catalyst is planned in advance.

5. The method according to claim 4, wherein the pollutant emissions are further optimized such that the reductant filling level of the SCR catalyst is regulated in advance.

6. The method according to claim 1, wherein the first stipulation comprises a second fact that nitrous oxide and reductant emissions of the internal combustion engine are below respective threshold values stored in the storage device of the electronic computing device.

7. The method according to claim 1, wherein the projection data comprises expected future speeds of the motor vehicle and/or a stretch profile lying ahead and/or a remaining distance to a destination.

8. The method according to claim 1, wherein the method is carried out several times one after the other during a journey of the motor vehicle.

* * * * *